United States Patent
McNeave

(10) Patent No.: US 9,969,227 B1
(45) Date of Patent: May 15, 2018

(54) AMPHIBIOUS UTILITY WAGON

(71) Applicant: Jessica McNeave, Apollo Beach, FL (US)

(72) Inventor: Jessica McNeave, Apollo Beach, FL (US)

(*) Notice: Subject to any disclaimer, the term of this patent is extended or adjusted under 35 U.S.C. 154(b) by 0 days. days.

(21) Appl. No.: 15/596,008

(22) Filed: May 16, 2017

(51) Int. Cl.
*B60F 3/00* (2006.01)
*B62B 3/02* (2006.01)

(52) U.S. Cl.
CPC ............ *B60F 3/0069* (2013.01); *B60F 3/003* (2013.01); *B60F 3/0007* (2013.01); *B62B 3/022* (2013.01)

(58) Field of Classification Search
CPC ...... B60F 3/0069; B60F 3/0007; B60F 3/003; B60F 3/022; B60F 3/0092; B60F 3/00; B62B 3/022; B62B 7/025; B62B 7/00; B62B 7/002; B62B 7/003; B62B 7/02; B62B 7/027
See application file for complete search history.

(56) References Cited

U.S. PATENT DOCUMENTS

| | | | | |
|---|---|---|---|---|
| 3,273,908 A * | 9/1966 | Geiser, Jr. | ................. | B62B 3/00 280/79.2 |
| 3,792,502 A * | 2/1974 | Odegaard | ............ | B60F 3/0092 114/344 |
| 4,109,926 A * | 8/1978 | Lane | ...................... | B62B 3/002 280/39 |
| 4,139,208 A | 2/1979 | Kaley et al. | | |
| 4,157,134 A * | 6/1979 | Stoll | ........................ | A45C 9/00 190/1 |
| 4,854,732 A * | 8/1989 | Italici | ....................... | A45C 3/00 150/107 |
| 5,123,371 A * | 6/1992 | Giordano | ................ | B63C 13/00 114/344 |
| 5,222,748 A * | 6/1993 | Johnson | .................... | B62B 3/02 280/19.1 |
| 5,265,892 A * | 11/1993 | Said | ........................ | B62B 1/208 280/10 |
| 5,291,846 A * | 3/1994 | Davis, Jr. | .............. | B60F 3/0007 114/344 |
| 5,318,312 A * | 6/1994 | Montemayor | ........ | B62B 5/0083 280/30 |
| 5,439,405 A * | 8/1995 | Storey | ...................... | A45C 9/00 441/126 |
| 5,649,718 A * | 7/1997 | Groglio | ................. | B62B 5/0003 280/43.17 |
| 5,653,618 A * | 8/1997 | Cheng | ..................... | B63B 35/38 441/130 |

(Continued)

OTHER PUBLICATIONS https://www.amazon.com/Folding-Collapsible-Foldable-Sports-Mac/dp/B01DYS0TPU.

*Primary Examiner* — Jacob B Meyer
(74) *Attorney, Agent, or Firm* — George L Williamson

(57) ABSTRACT

Method and apparatus for a floatable and collapsible cart having a storage compartment formed by a framed assembly with waterproof material mounted thereon. Floatation material is disposed in the bottom of the storage compartment and front and rear ground contacting wheels are provided below and in line with the opposite sides of the storage compartment which may be converted between a folded position and an unfolded position. Objects may be loaded into the storage compartment and pulled by a user on the surface of the water between a boat and the seashore and then rolled along the seashore. A pull cord is provided for pulling the wagon.

12 Claims, 3 Drawing Sheets

(56) References Cited

U.S. PATENT DOCUMENTS

| | | | | |
|---|---|---|---|---|
| 5,704,624 A * | 1/1998 | Davis | B62B 3/00 | 280/19 |
| 5,797,528 A * | 8/1998 | McDuffie | A01K 97/06 | 150/154 |
| 5,857,695 A * | 1/1999 | Crowell | B62B 3/007 | 280/30 |
| 5,915,723 A * | 6/1999 | Austin | B62B 3/02 | 280/43 |
| 6,375,200 B1 * | 4/2002 | Harter | A01M 31/00 | 280/30 |
| 6,491,318 B1 * | 12/2002 | Galt | B62B 3/02 | 280/42 |
| 6,536,367 B1 * | 3/2003 | Carter | B60F 3/0092 | 114/344 |
| 6,851,382 B2 * | 2/2005 | Carter | B60F 3/0092 | 114/344 |
| 7,063,037 B1 * | 6/2006 | Parks | B63B 17/00 | 114/343 |
| 7,770,913 B2 * | 8/2010 | Cannon | B62B 1/08 | 280/278 |
| 7,959,182 B2 * | 6/2011 | Klein | A01K 97/01 | 280/47.18 |
| 8,783,698 B1 * | 7/2014 | Elizondo | B62B 5/00 | 280/47.34 |
| 9,073,564 B2 * | 7/2015 | Yang | B62B 3/02 | |
| 9,187,110 B2 * | 11/2015 | Bar Noy | B62B 3/02 | |
| 9,211,897 B2 * | 12/2015 | Yang | B62B 3/02 | |
| 9,327,749 B2 * | 5/2016 | Young | B62B 3/02 | |
| D770,966 S * | 11/2016 | Teixeira | D12/316 | |
| 9,533,744 B2 * | 1/2017 | Leatherman | B63C 9/26 | |
| 9,738,298 B1 * | 8/2017 | Yang | B62B 3/025 | |
| 2003/0071427 A1 * | 4/2003 | Simione | A62C 3/00 | 280/47.34 |
| 2003/0127476 A1 * | 7/2003 | Lockard | A45F 4/02 | 224/153 |
| 2004/0222617 A1 * | 11/2004 | Darling, III | A61G 1/013 | 280/651 |
| 2005/0173875 A1 * | 8/2005 | Stedry | B62B 1/208 | 280/30 |
| 2006/0091632 A1 * | 5/2006 | Buck | A61G 1/0293 | 280/79.11 |
| 2006/0186699 A1 * | 8/2006 | Davis | B60G 3/06 | 296/187.01 |
| 2007/0029747 A1 * | 2/2007 | Islo | B60F 3/0069 | 280/47.35 |
| 2008/0048417 A1 * | 2/2008 | Schroeder | A01M 31/00 | 280/656 |
| 2008/0217886 A1 * | 9/2008 | Poppinga | B62B 3/02 | 280/651 |
| 2010/0136863 A1 * | 6/2010 | Vick | B63C 9/115 | 441/118 |
| 2011/0270696 A1 * | 11/2011 | Vincent | A45C 3/04 | 705/23 |
| 2012/0102650 A1 * | 5/2012 | McGlynn | A61G 1/00 | 5/627 |
| 2012/0119458 A1 * | 5/2012 | Simoes | B62B 3/025 | 280/33.998 |
| 2012/0205884 A1 * | 8/2012 | Craven | B62B 1/008 | 280/47.3 |
| 2013/0076005 A1 * | 3/2013 | McDade | B62B 1/20 | 280/418.1 |
| 2014/0001735 A1 * | 1/2014 | Yang | B62B 3/02 | 280/651 |
| 2014/0284902 A1 * | 9/2014 | Bar Noy | B62B 3/02 | 280/640 |
| 2015/0151771 A1 * | 6/2015 | Jin | B62B 3/027 | 280/651 |
| 2015/0166091 A1 * | 6/2015 | Yang | B62B 3/02 | 280/651 |
| 2015/0329135 A1 * | 11/2015 | Sun | B62B 9/24 | 280/649 |
| 2016/0009346 A1 * | 1/2016 | Leatherman | B63C 9/26 | 150/106 |
| 2016/0347338 A1 * | 12/2016 | Vargas, II | B62B 3/02 | |
| 2017/0015340 A1 * | 1/2017 | Fitzwater | B62B 3/022 | |
| 2017/0259838 A1 * | 9/2017 | Choi | B62B 3/025 | |

* cited by examiner

AMPHIBIOUS UTILITY WAGON

BACKGROUND OF THE INVENTION

Field of the Invention

The present invention relates generally to utility wagons and, more particularly, is concerned with an amphibious utility wagon.

Description of the Related Art

Devices relevant to the present invention have been described in the related art, however, none of the related art devices disclose the unique features of the present invention. In U.S. Pat. No. 3,792,502 dated Feb. 19, 1974, Odegaard disclosed an amphibious vehicle. In U.S. Pat. No. 4,139,208 dated Feb. 13, 1979, Kaley, et al., disclosed a multi-purpose light cart. In U.S. Pat. No. 5,318,312 dated Jun. 7, 1994, Montemayor disclosed a portable folding utility carrier. In U.S. Pat. No. 6,536,367 dated Mar. 25, 2003, Carter disclosed a floating, collapsible utility trailer. In U.S. Pat. No. 8,783,698 dated Jul. 22, 2014, Elizondo, et al., disclosed an all-terrain floating, accessories buggy. In U.S. Pat. No. 6,851,382 dated Feb. 8, 2005, Carter disclosed a floating, collapsible utility trailer. In U.S. Patent Application Publication No. 2008/0048417 dated Feb. 28, 2008, Schroeder disclosed an amphibious utility cart and transport system incorporating same.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a floatable and collapsible wagon-like device having a compartment-like carrying portion supported by a ground-contacting wheeled frame assembly upon which is mounted a collapsible canvas-like covering which is waterproof. Also disclosed is flotation material made in two pieces which is disposed in the bottom of the compartment-like portion. Front and rear wheels are disposed underneath the frame assembly so that the device can be pulled along the surface of the ground. The primary purpose of the device is expected to be transporting items between a boat floating in the water offshore of a beach to the beach. The device is designed to be towed by a user on the water's surface between a boat and the edge of the seashore and when the device reaches the seashore, the ground-engaging wheels roll along the surface of the ground in the usual manner. A pull cord is connected onto the front of the device so that a user can tow the device behind the user as the user walks along the surface of the ground or through the water. The frame assembly folds into a collapsed position so that it takes up very little room inside the transporting boat.

An object of the present invention is to provide a wheeled cart which can be used to float objects from an offshore boat toward the seashore and then to be rolled along the surface of the beach after the user reaches the edge of the seashore. A further object of the present invention is to provide a wheeled wagon-like device which can be folded into a small area for storage on a boat or a similar vehicle. A further object of the present invention is to provide a wheeled wagon-like device which can be easily towed behind a user along the surface of the water and along the surface of the ground or shore. A further object of the present invention is to provide a portable wagon-like device which can be easily operated by a user. A further object of the present invention is to provide a portable wagon-like device which can be relatively inexpensively manufactured and operated.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
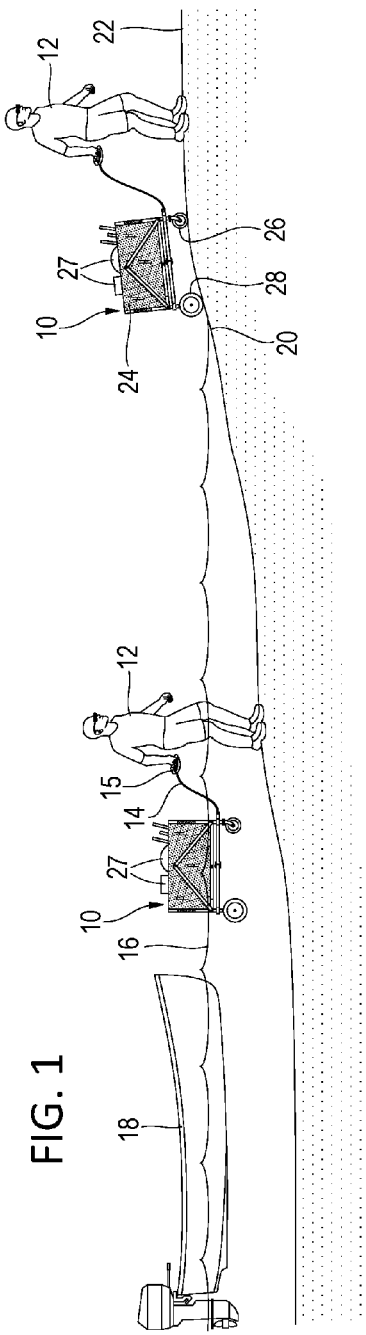
FIG. 1 is a perspective environmental view showing the present invention in operative connection.

With regard to reference numerals used, the following numbering is used throughout the drawings.
- 10 present invention
- 12 user
- 14 pull cord
- 15 handle
- 16 water surface
- 18 boat/vessel
- 20 edge of seashore
- 22 surface of beach/ground
- 24 storage compartment
- 26 front wheels
- 27 miscellaneous items
- 28 rear wheels
- 30 frame assembly
- 32 corner post
- 34 support base frame
- 36 lower side frame member
- 37 pivot joint
- 38 lower side frame member
- 39 front cross member
- 40 lower front frame member
- 41 rear cross member 42 lower rear frame member
43 side support frame
44 side support frame
46 upper pivot joint
47 lower pivot joint
48 lower frame cross member support
50 anti-folding support brace
52 anti-folding support brace
54 adjustable bracket
56 canvas cover
58 corner wrap
60 front wall
62 rear wall
64 left side wall
66 right side wall
68 bottom
69 pocket
70 bolt
72 floating material
74 foam covering
76 attachment point
78 space
80 vertical support member
82 connecting collar

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 6 illustrate the present invention wherein a floating, collapsible wagon-like device is disclosed and which is generally indicated by reference number 10.

Turning to FIG. 1, therein is shown the present invention 10 being a floating wagon-like device being pulled by a user 12 using a pull cord 14 with handle 15 attached to the present invention 10 wherein the wagon-like device is being towed along the surface of the water 16 from a boat or like vessel 18 wherein the present invention 10 floats along the surface of the water until it reaches the edge of the seashore 20 wherein the wagon-like device or cart is rolled along the surface of the beach or ground 22 using its front 26 and rear wheels 28. Contained in the storage compartment 24 of the present invention 10 can be various miscellaneous items 27 which are being carried from the boat 18 onto the beach 22 for use by the user 12. The handle 15 is being held in a hand of the user 12.

Figure 2:
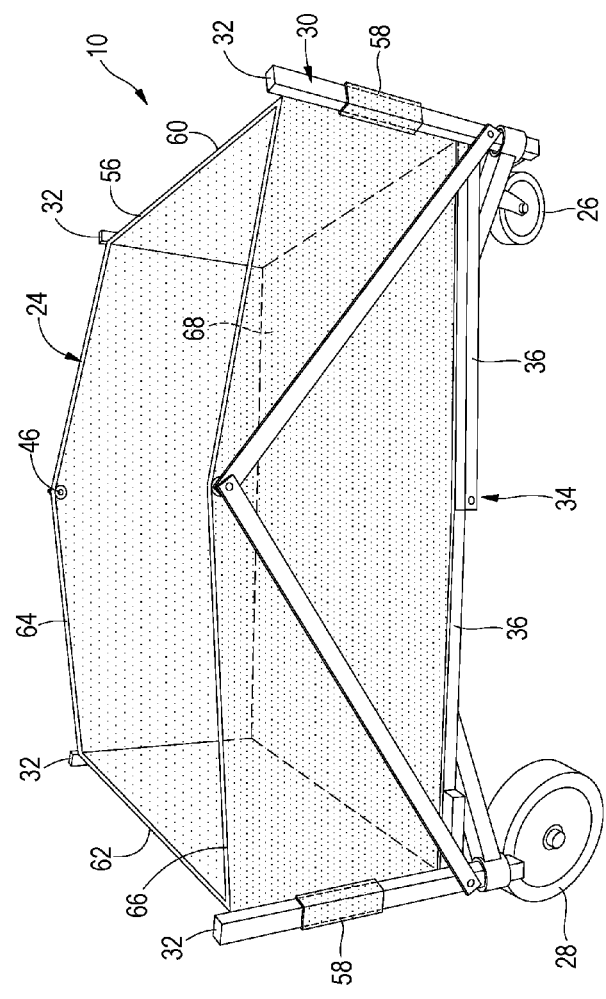
FIG. 2 is a perspective view of the present invention.
Figure 3:
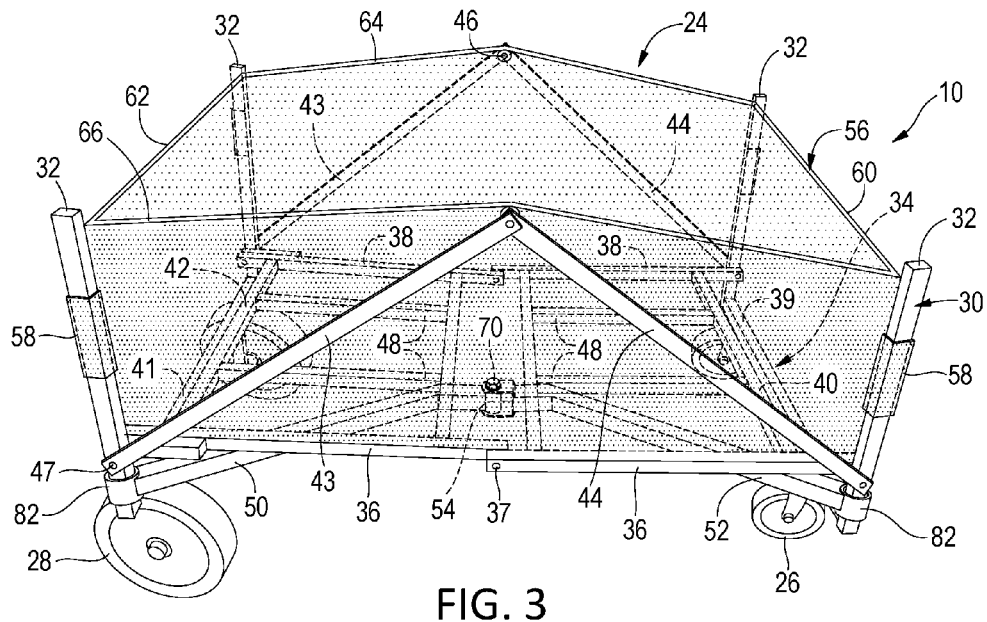
FIG. 3 is a perspective view of the present invention also showing the frame assembly of the present invention in hidden lines.
Figure 4:
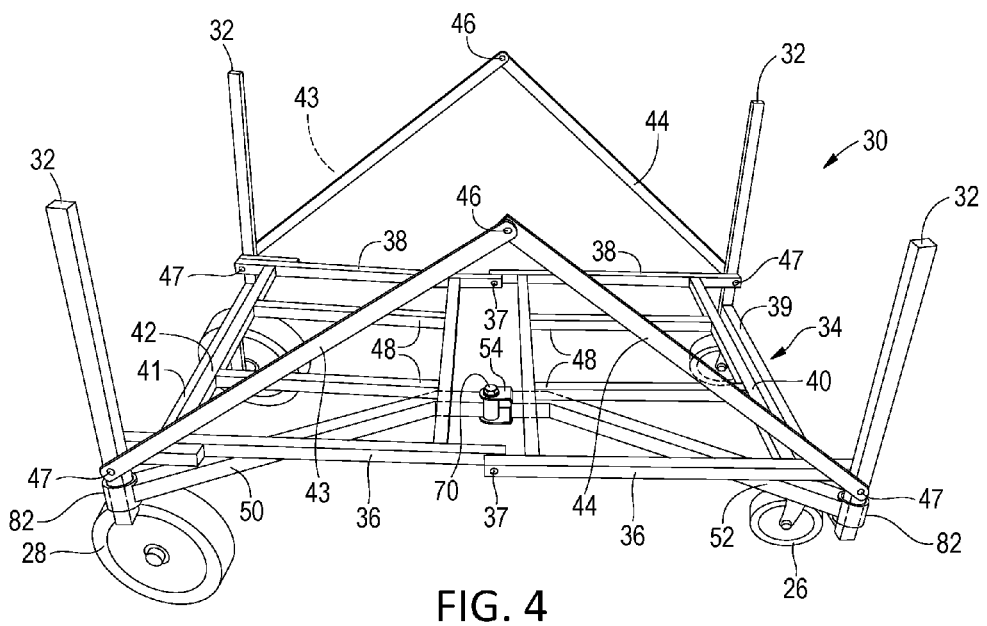
FIG. 4 is a perspective view of the frame assembly of the present invention.

Turning to FIGS. 2-4, therein is shown the present invention 10 including a frame assembly generally shown at 30 being generally rectangularly shaped and having an upright member or post 32 at each corner which is supported by an underlying frame assembly being substantially horizontally disposed being generally shown at 34 and comprising first and second lower side frame members 36, 38 and lower front and rear lower frame members 40, 42 which together form a rectangular shaped support base. The lower side frames are shown at 36, 38 and the front and rear frames are shown at 40 and 42 wherein each of the side frames also contain a pivoting joint 37 being intermediately disposed so that the frame assembly 30 can be folded into a compact unit. Cross members 39, 41 extend between front and rear corner members 32, respectively.

Also shown on the sides of the storage compartment 24 and of the frame assembly 30 are left and right, first and second side support frame members 43 and 44 which join at an upper pivotable apex point 46 along with lower pivot points 47 near the base of the corner post 32 wherein an end of frame members 36, 38 share a common pivot point 47 to assist in folding the present invention 10 and to provide additional side support. A plurality of lower frame cross members 48 are also shown which are miscellaneous cross members providing additional structural support and forming a part of the lower support base frame 34. Additionally, therein is shown a large anti-folding support brace 50, 52 disposed underneath the support base frame 34 which has front and rear portions which are joined in the middle 54 by a coupling secured by a bolt 70 with nut, or like fastener, which coupling can have its tension adjusted so as to prevent the lower support base 34 from inadvertently folding. Anti-folding brace 50, 52 folds in the horizontal plane and must be folded first before any of the support base frame 34 members can be folded in the vertical position. Each end of anti-folding member 50, 52 is connected to upright corner member 32 with a rotatable connecting collar 82 and each anti-folding member has vertical support members 80 disposed beneath the base support frame 34 at the pivot joint 37 to prevent the base support frame from moving below the horizontal plane.

Also shown generally at 56 is the flexible canvas-like covering material which forms the walls and bottom of the generally rectangular shaped storage compartment 24 which has a flap-like or loop-like corner wrap member 58 disposed at each corner of the corner upright support member 32 of the frame assembly 30 so that the flexible material 56 is disposed on and within the four corners of the frame assembly much as though it was draped or placed inside the four corners of the frame assembly. The corner wrap member 58 can be easily attached to and removed from the corner supports 32 of the frame assembly 30 so that the entire flexible material or canvas portion 56 of the storage compartment 24 can be easily removed from the frame assembly 30. Hook and loop material may also be disposed on the corner wrap member 58 for folding the member back upon itself for attachment around and to the corner upright support member 32. The storage compartment 24 has front 60 and rear 62 walls, and left 64 and right 66 side walls formed by canvas cover 56 along with floor 68 altogether forming a compartment for receiving items 27 therein. Floor/bottom 68 generally rests on and is supported by the support base 34. Left and right walls 64, 66 are each secured to the upper pivot joint 46 using a fastener, such as a wing nut or the like, which assures that the walls of the compartment 24 will not collapse inwardly. Apex pivot point 46 is higher than either the front or rear walls 60, 62. Previously disclosed elements may also be shown.

Figure 5:
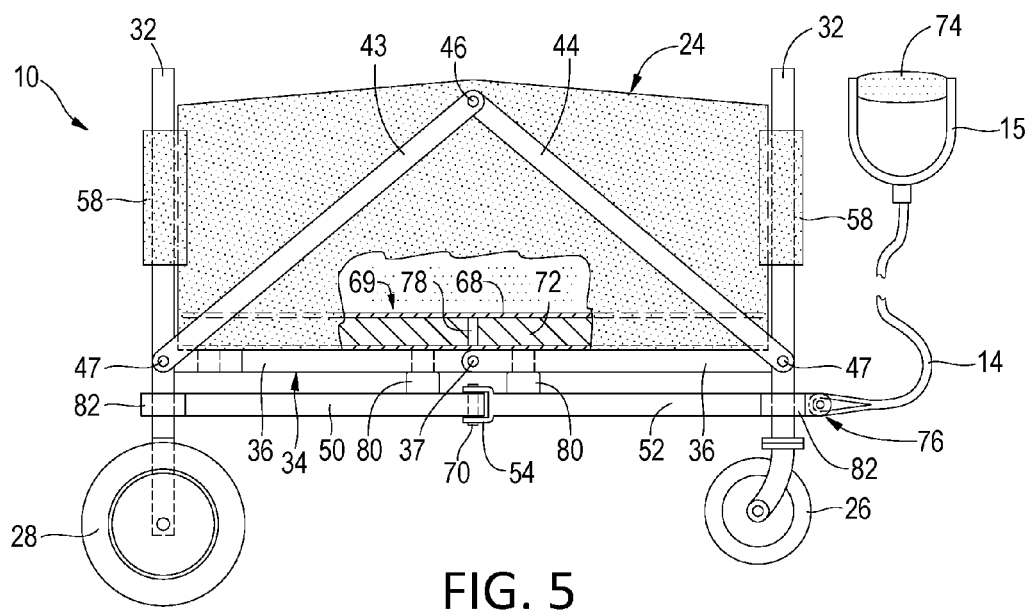
FIG. 5 is a side elevation view of the present invention showing portions in cross-section for the sake of clarity.

Turning to FIG. 5, therein is shown the present invention 10 showing previously disclosed elements along with the floatation material 72 made of foam or like material which is disposed in the bottom 68 of the storage compartment 24 which provides additional buoyancy to the present invention in addition to the buoyancy created as a result of the water displacement capacity of the storage compartment 24. Flotation material 72 is effectively thick to provide necessary buoyancy and is sized and shaped to fit into pocket(s) 69 made into the canvas cover 56 material which forms the bottom 68 of the present invention 10. The floating material 72 is made of two portions with a space 78 therebetween to allow the material to be folded. Also shown is the pull cord 14 and handle 15 along with a foam covering 74 on the hand grip. Pull cord 14 is attached at 76 to the frame of the present invention 10. Previously disclosed elements are also shown.

Figure 6:
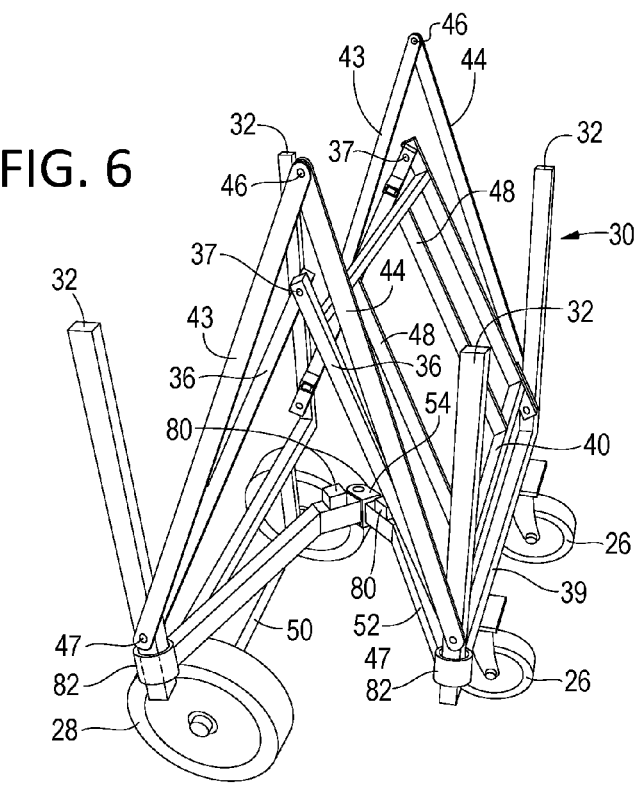
FIG. 6 is a perspective view of the frame assembly of the present invention in a folded position.

Turning to FIG. 6, therein is shown the present invention 10 in the folded position showing the folded frame assembly 30 along with the folded anti-folding brace 50, 52. Previously disclosed elements are also shown.

In brief summary, the present invention 10 discloses a floatable and collapsible/folding cart/wagon that includes a storage compartment 24; a floatation material 72 disposed in the bottom 68 of the storage compartment; right and left, front 26 and rear 28 wheels below and in line with the opposite sides of the storage compartment may be converted between a folded position in which the wheels are folded toward each other and an extended (unfolded) position in which the wheels and opposite sides of the wagon body are disposed outward away from one another. All of this enables loading of objects 27 into the compartment body and pulling the loaded wagon in sand to and from the shore 20, and subsequently floating the loaded wagon between the shore and a boat 18; and, also a collapsed position after the objects are unloaded from the compartment body, in which the wheels and opposite sides of the wagon body are disposed inward toward one another to enable stowing of the collapsed wagon out of the way on the boat or a vehicle. Also shown is a pull cord arrangement connected to the wagon body that may be useful for pulling the wagon and also the cord may be manipulated to assist in converting the wagon body between an extended and collapsed condition.

It is expected that the frame assembly 30 will be made of lightweight materials, such as aluminum or possibly high strength plastic-like material; the canvas material is expected to be made of waterproof material such as neoprene or similar material; and, the flotation material is expected to be made of high density foam or like material.

By way of summary and making reference to FIGS. 1-6, the present invention 10 discloses an apparatus and method for an amphibious wagon 10 for transporting items on a surface of a water body 16 and a surface of a ground 22 including a frame assembly 30 being substantially rectangular shaped including an upright corner member 32 disposed on each corner of the frame assembly, the frame assembly including a support base 34 having a front portion 40 and a rear portion 42, wherein the front portion and the rear portion are pivotally joined together at a point 37 intermediate the front and rear portions so that the support base has an unfolded position (FIG. 4) and a folded position (FIG. 6); a left and a right side support frame 43, 44 on each longer side of the frame assembly, wherein each side support frame extends from a lower portion 47 of each upright corner member to an apex 46 intermediate the upright corner members, each side support frame being pivotable at the apex so that the side support frame can be folded along with the support base between the unfolded position and the folded position; providing a storage compartment 24 by disposing a flexible material 56 on the frame assembly, the storage compartment having a front wall 60, a rear wall 62, a left 64 and right side wall 66, a bottom 68, and being open on a top, wherein the flexible material is removably attached to each upright corner member and each left and right side support frame, wherein the flexible material rests on an upper surface of the horizontally disposed support base, wherein the storage compartment provides buoyancy for the amphibious wagon for transporting items 27 on the surface of the water body; left and right front wheels 26 underneath the front portion of the support base, and left and right rear wheels 28 underneath the rear portion of the support base so that the wheels are useful for rolling the amphibious wagon along the surface of the ground; and, providing a pull cord 14 on the front portion of the support base for pulling the amphibious wagon along the surface of the water body and the surface of the ground. Also, providing an anti-folding support brace 50, 52 disposed underneath the horizontally disposed support base to prevent the support base from being inadvertently folded, wherein the anti-folding brace folds in a first plane perpendicular to a second plane in which the support base folds, wherein the anti-folding brace joins to one upright corner member on one side of the front and rear portion of the support base 82, and having a pivotable coupling 54 intermediate the anti-folding brace, wherein the pivotable coupling is adjustable at 70 so as to vary the tension on the pivotable coupling, wherein the anti-folding brace must be folded first before the support base is folded, wherein the flexible material attaches to each upright corner member using a portion 58 of the flexible material extending around each upright corner member, and placing flotation material 72 in the bottom of the storage compartment for providing additional buoyance to the amphibious wagon, wherein the flotation material is disposed in a pocket 69 provided in the flexible material, wherein the flotation material can be inserted into and removed from the pocket, and, wherein the flotation material has first and second portions having a space 78 disposed thereinbetween the first and second portions so that the flotation material can be folded along with the support base between the unfolded position and the folded position.

I claim:

1. An amphibious wagon, the amphibious wagon for transporting items on a surface of a water body and a surface of a ground, comprising:
    a) a frame assembly being substantially rectangular shaped having a plurality of corners, an upright corner member disposed on each said corner of said frame assembly, said frame assembly including a support base having a front portion and a rear portion, wherein said front portion and said rear portion are pivotally joined together at a point intermediate said front and rear portions so that said support base has an unfolded position and a folded position;
    b) a left and a right side support frame disposed on a longer side of said frame assembly, wherein each said side support frame extends from a lower portion of each said upright corner member to an apex intermediate said upright corner members, each said side support frame being pivotable at said apex so that said side support frame can be folded along with said support base between said unfolded position and said folded position;
    c) a storage compartment defined by a flexible material disposed on said frame assembly, said storage compartment having a front wall, a rear wall, a left and right side wall, a bottom, and being open on a top, wherein said flexible material is removably attached to each said upright corner member and each said left and right side support frame, wherein said flexible material rests on an upper surface of said support base, wherein said storage compartment provides buoyancy for the amphibious wagon for transporting items on the surface of the water body;
    d) left and right front wheels disposed underneath said front portion of said support base, and left and right rear wheels disposed underneath said rear portion of said support base so that said wheels are useful for rolling the amphibious wagon along the surface of the ground;

e) a pull cord disposed on said front portion of said support base for pulling the amphibious wagon along the surface of the water body and the surface of the ground;

f) an anti-folding support brace disposed underneath said support base to prevent said support base from being inadvertently folded, wherein said anti-folding support brace folds in a first plane perpendicular to a second plane in which said support base folds;

g) wherein said anti-folding support brace joins to one said upright corner member on one side of said front and rear portion of said support base, and having a pivotable coupling intermediate said anti-folding brace; and h) wherein said pivotable coupling is adjustable so as to vary the tension on said pivotable coupling.

2. The amphibious wagon of claim 1, wherein said anti-folding brace is foldable first before said support base is foldable.

3. The amphibious wagon of claim 1, wherein said flexible material attaches to each said upright corner member using a wrap extending around each said upright corner member.

4. The amphibious wagon of claim 1, further comprising flotation material being disposed in said bottom of said storage compartment for providing additional buoyancy to the amphibious wagon.

5. The amphibious wagon of claim 4, wherein said flotation material is disposed in a pocket provided in said flexible material wherein said flotation material can be inserted into and removed from said pocket.

6. The amphibious wagon of claim 5, wherein said flotation material has first and second portions having a space disposed thereinbetween said first and second portions so that said flotation material can be folded along with said support base between said unfolded position and said folded position.

7. A method for assembling an amphibious wagon, the amphibious wagon for transporting items on a surface of a water body and a surface of a ground, comprising the steps of:

a) providing a frame assembly being substantially rectangular shaped including an upright corner member disposed on each corner of the frame assembly, the frame assembly including a support base having a front portion and a rear portion, wherein the front portion and the rear portion are pivotally joined together at a point intermediate the front and rear portions so that the support base has an unfolded position and a folded position;

b) providing a left and a right side support frame on a longer side of the frame assembly, wherein each side support frame extends from a lower portion of each upright corner member to an apex intermediate the upright corner members, each side support frame being pivotable at the apex so that the side support frame can be folded along with the support base between the unfolded position and the folded position;

c) forming a storage compartment by disposing a flexible material on the frame assembly, the storage compartment having a front wall, a rear wall, a left and right side wall, a bottom, and being open on a top, wherein the flexible material is removably attached to each upright corner member and each left and right side support frame, wherein the flexible material rests on an upper surface of the support base, wherein the storage compartment provides buoyancy for the amphibious wagon for transporting items on the surface of the water body;

d) providing left and right front wheels underneath the front portion of the support base, and left and right rear wheels underneath the rear portion of the support base so that the wheels are useful for rolling the amphibious wagon along the surface of the ground;

e) providing a pull cord on the front portion of the support base for pulling the amphibious wagon along the surface of the water body and the surface of the ground;

f) providing an anti-folding support brace disposed underneath the support base to prevent the support base from being inadvertently folded, wherein the anti-folding support brace folds in a first plane perpendicular to a second plane in which the support base folds;

g) wherein the anti-folding support brace joins to one upright corner member on one side of the front and rear portion of the support base, and having a pivotable coupling intermediate the anti-folding brace; and h) wherein the pivotable coupling is adjustable so as to vary the tension on the pivotable coupling.

8. The method of claim 7, wherein the anti-folding brace must be folded first before the support base is folded.

9. The method of claim 7, wherein the flexible material attaches to each upright corner member using a portion of the flexible material extending around each upright corner member.

10. The method of claim 7, further comprising the step of placing flotation material in the bottom of the storage compartment for providing additional buoyance to the amphibious wagon.

11. The method of claim 10, wherein the flotation material is disposed in a pocket provided in the flexible material, wherein the flotation material can be inserted into and removed from the pocket.

12. The method of claim 11, wherein the flotation material has first and second portions having a space disposed thereinbetween the first and second portions so that the flotation material can be folded along with the support base between the unfolded position and the folded position.

\* \* \* \* \*